(12) United States Patent
Suvernev et al.

(10) Patent No.: US 7,860,848 B2
(45) Date of Patent: Dec. 28, 2010

(54) PARTIAL SUB-LOCK FOR DELTA OBJECT MANAGEMENT

(75) Inventors: Andrei Suvernev, Palo Alto, CA (US); Thorsten Glebe, Leimen (DE)

(73) Assignee: SAP AG, Walldorf (DE)

(*) Notice: Subject to any disclaimer, the term of this patent is extended or adjusted under 35 U.S.C. 154(b) by 397 days.

(21) Appl. No.: 11/731,195

(22) Filed: Mar. 30, 2007

(65) Prior Publication Data

US 2008/0243913 A1  Oct. 2, 2008

(51) Int. Cl.
*G06F 17/00* (2006.01)
(52) U.S. Cl. .................... 707/704; 711/113
(58) Field of Classification Search ............ None
See application file for complete search history.

(56) References Cited

U.S. PATENT DOCUMENTS

2004/0199521 A1* 10/2004 Anglin et al. ............ 707/100
2007/0100796 A1* 5/2007 Wang ........................ 707/3
2008/0086470 A1* 4/2008 Graefe ....................... 707/8

* cited by examiner

*Primary Examiner*—Charles Kim
*Assistant Examiner*—Anteneh Girma
(74) *Attorney, Agent, or Firm*—Buckley, Maschoff & Talwalkar LLC (57) ABSTRACT

A system may include creation a first database object associated with a primary key and a first delta ID m, association of a first pointer with the first database object, creation of a data structure associating the first pointer with a first index m, a second index m and a delta object map, determination of a request from a transaction to change a database object associated with the first pointer, incrementing of the first index of the data structure, creation of a second database object associated with the primary key and a second delta ID m+1, the second database object being associated with a change to the first database object, and modification of the delta object map to indicate the second database object.

25 Claims, 10 Drawing Sheets

PARTIAL SUB-LOCK FOR DELTA OBJECT MANAGEMENT

FIELD

Some embodiments relate to management of database objects within a database system. In particular, some embodiments concern managing parallel accesses to a database object.

BACKGROUND

A conventional database system manages access and updates to stored database objects using locks. For example, in order to update a database object, a transaction may first be required to acquire an exclusive lock associated with the database object. The foregoing technique may prevent parallel transactions from creating data inconsistencies by independently updating a same database object.

Parallel transactions are acceptable for some types of data (e.g., numbers) and some types of update operations (e.g., addition, subtraction). Such update operations may be applied to the data in any particular order without jeopardizing data consistency. However, the conventional locking techniques are unsuitable for supporting parallel transactions.

DETAILED DESCRIPTION

Figure 1:
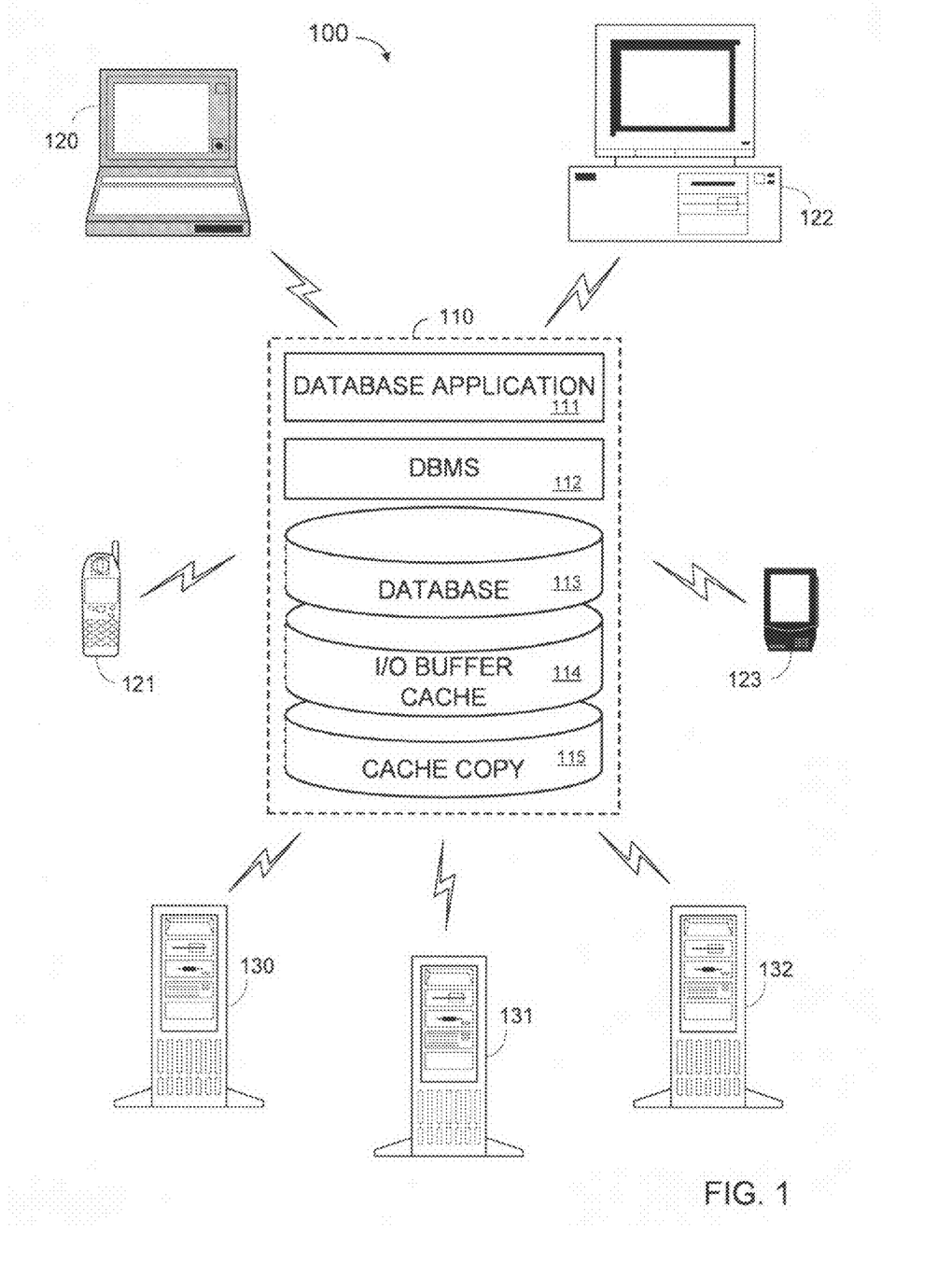
FIG. 1 is a block diagram of a hardware architecture according to some embodiments.

FIG. 1 is a block diagram of system 100 according to some embodiments. System 100 illustrates a client-server database environment including application/database server 110, client devices 120 through 123, and data sources 130 through 132. Other system topologies may be used in conjunction with other embodiments.

Server 110 may operate to receive, store, manage and provide data. Such data may be received from sources such as data sources 130 through 132 and/or generated by server 110. The data may be provided to client devices 120 through 123 in response to requests received therefrom. Server 110 of system 100 includes database application 111, database management system (DBMS) 112, database 113, input/output (I/O) buffer cache 114 and cache copy 115.

Database application 111 may provide order fulfillment, business monitoring, inventory control, online shopping, and/ or any other suitable functions via interactions with other elements of server 110. According to some embodiments, database application 111 communicates with DBMS 112 over one or more interfaces provided by DBMS 112. Database application 111 may, in turn, support client applications executed by client devices 120 through 123. Such a client application may simply comprise a Web browser to access and display reports generated by database application 111. In this regard, server 110 may comprise a Web server to manage interactions with client devices 120 through 123.

DBMS 112 may comprise any system for managing a database instance that is or becomes known. Generally, DBMS 112 may receive requests for data (e.g., Structured Query Language (SQL) requests from database application 111), may retrieve requested data from database 113, and may return the requested data to the requestor. DBMS 112 may also perform start-up, logging, recovery, management, optimization, monitoring and other database-related tasks.

Database 113 may comprise one or more disparate systems for storing data, therefore DBMS 112 may comprise one or more systems for retrieving stored data. According to some embodiments, database 113 is implemented as any suitable collection of data that may be accessed by a computer program to select particular data from the collection.

The data of database 113 may include data records and associated index entries (i.e. application data), as well as configuration files, database parameters, paths, user information and any other suitable information. In some embodiments, database 113 is an element of an Online Transaction Processing (OLTP) database instance. An OLTP database instance may be suited for processing individual transactions quickly within an environment consisting of a large number of users and a large database.

During database execution, various elements of the database are stored in I/O buffer cache 114. These elements may include recently-accessed pages of application data, converter pages, database catalog objects and/or a log queue. Cache copy 115 comprises a copy of all or a portion of cache 114. Cache copy 115 may comprise a liveCache™ database instance that facilitates object-oriented manipulation of the copied cache data.

For example, cache copy 115 may store copies of some or all of the data within instances of object-oriented (e.g., C++) classes. Such instances may be referred to as database objects, and may be stored persistently according to some conventional database systems. Cache copy 115 will be described in further detail below with respect to FIG. 2.

Server 110 may include other unshown elements that may be used during operation thereof, such as any suitable program code, scripts, or other functional data that is executable to interface with other elements of system 100, other applications, other data files, operating system files, and device drivers. These elements are known to those skilled in the art, and are therefore not described in detail herein.

Data sources 130 through 132 may comprise any sources of any data that may provide data to server 110. The data may be pushed to server 100 and/or provided in response to queries received therefrom. One or more of data sources 130 through 132 may comprise a back-end data environment employed in a business or industrial context. Data sources 130 through 132 may therefore comprise many disparate hardware and software systems, some of which are not interoperational with one another.

Two or more of the elements of system 100 may be located remote from one another and may communicate with one another via a network and/or a dedicated connection. Moreover, each displayed element of system 100 may comprise any number of hardware and/or software elements, some of which are located remote from each other.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 2:
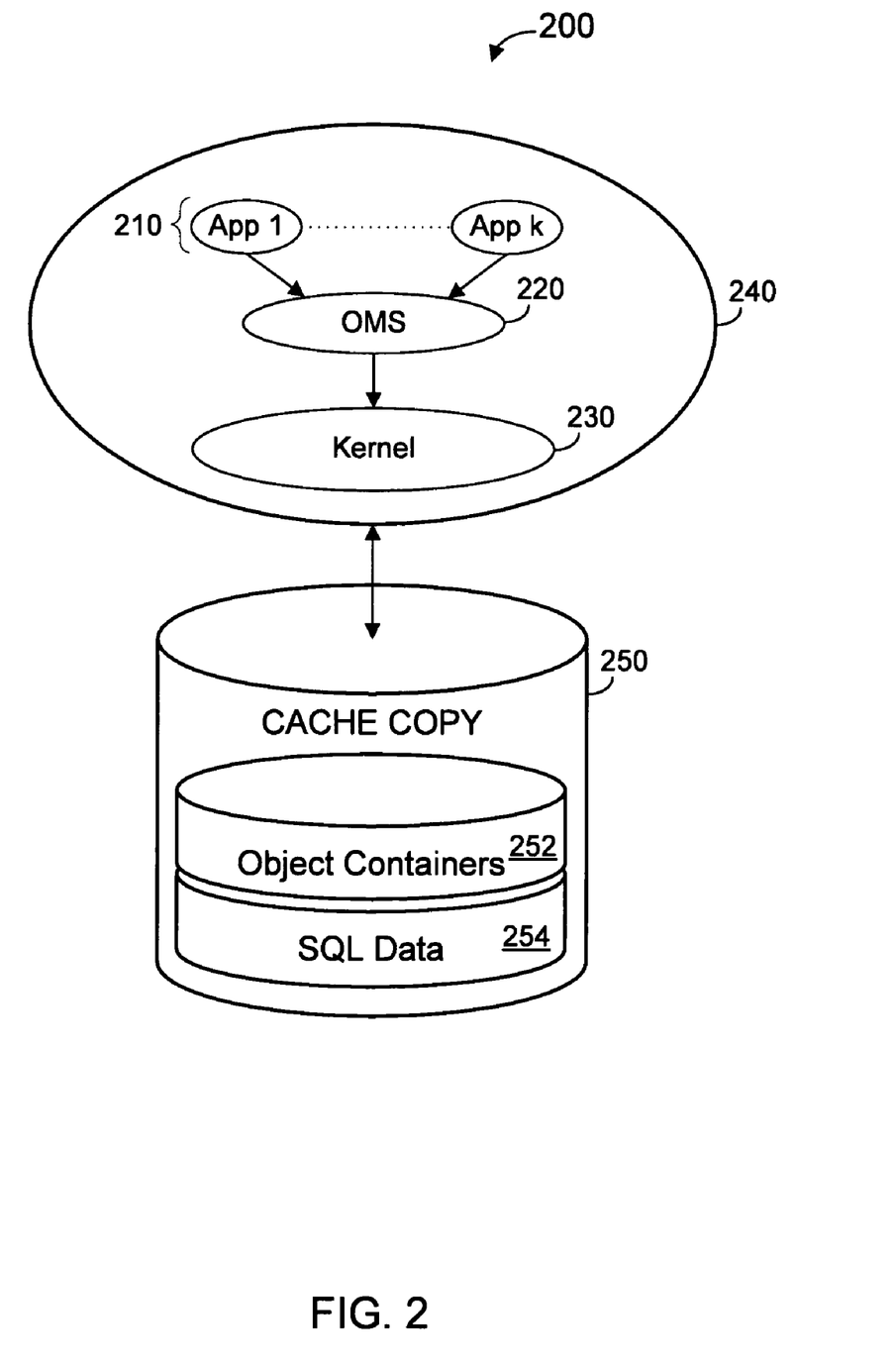
FIG. 2 is a block diagram of a database system according to some embodiments.

An SAP liveCache® database instance may provide a data cache of persistent database objects as described above. Such database objects are managed by an Object Management System (OMS). An OMS may be implemented as an object-oriented library (i.e., liboms) that is linked to a liveCache kernel. FIG. 2 illustrates elements of liveCache database instance 200 in which some embodiments may be implemented.

Application logic written in object-oriented code is built into application libraries 210 against OMS liboms 220 and kernel 230. Application libraries 210, OMS liboms 220, and kernel 230 may comprise "executable" 240 that executes within a common address space. Executable 240 may comprise an element of DBMS 112 of FIG. 1, and may comprise any system for managing a database instance that is or becomes known.

Libraries 210 contain routines that may be called as database procedures by external workprocesses. The routines provided by application libraries 210 allow an external workprocess to create, modify and delete persistent database objects. OMS 220 operates in conjunction with libraries 210 to manage the persistent database objects and may also perform optimization, monitoring and other database-related tasks. OMS 220 may provide libraries 210 with locking functionality for parallel updates to persistent objects as described herein.

Database 250 may comprise an implementation of cache copy 115 of FIG. 1. Database 250 stores the aforementioned persistent database objects within class-specific object containers 252. As shown in FIG. 2, database 250 may also store Structured Query Language (SQL) data 254 to be accessed by executable 240.

Figure 3:
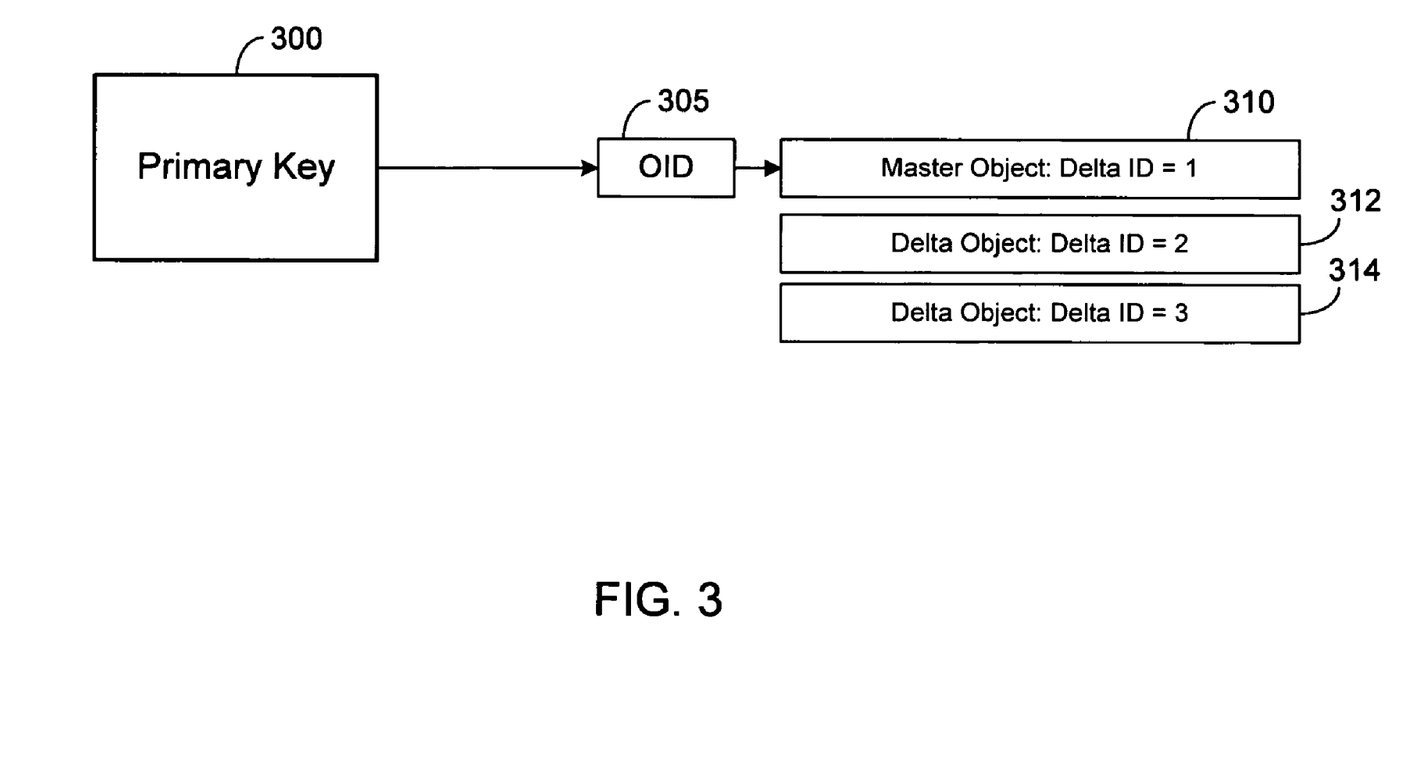
FIG. 3 illustrates relationships between a primary key, an OID, a master objects and delta objects according to some embodiments.

To facilitate the following description of parallel access to a single database object, FIG. 3 is a diagram illustrating relationships between primary key 300, Object ID (OID) 305, master object 310 and delta objects 312 and 314 according to some embodiments.

Generally, a primary key consists of one or more data fields of an object whose values are used to reference the object. Any object needing to reference a first object therefore includes the primary key of the first object. Since primary keys may occupy a significant number of bytes, an amount of memory devoted to primary key storage may quickly become unacceptable. The amount of memory may be reduced by referencing each primary key using a small object of fixed size (e.g., an OID).

The OIDs may be provided to OMS 220 by kernel 230 and/or provided by OMS 220 to application libraries 210. Like a primary key, application libraries 210 may use the provided OIDs to request changes to the objects associated therewith. Primary key 300 represents a primary key of an object stored among object containers 252.

Master object 310 may be created in response to a request to change the object associated with primary key 300, if it is determined that the object is not stored persistently. Master object 310 is associated with OID 305 and a delta ID. Master object 310 may therefore be accessed by de-referencing OID 305.

Delta objects 312 and 314 are also associated with the OID and with a unique delta ID. As shown, the delta ID is incremented for each newly-created delta object associated with an OID. Each of delta objects 312 and 314 may be created in response to a request to change an object associated with OID 305. According to the present example, the request is received while the object is locked by another transaction.

The request may be received from a transaction via application libraries 210. However, unlike master object 310, de-referencing OID 305 does not provide direct access to either of objects 312 and 314. Accordingly, delta objects 312 and 314 may be invisible to application libraries 210.

Figure 4:
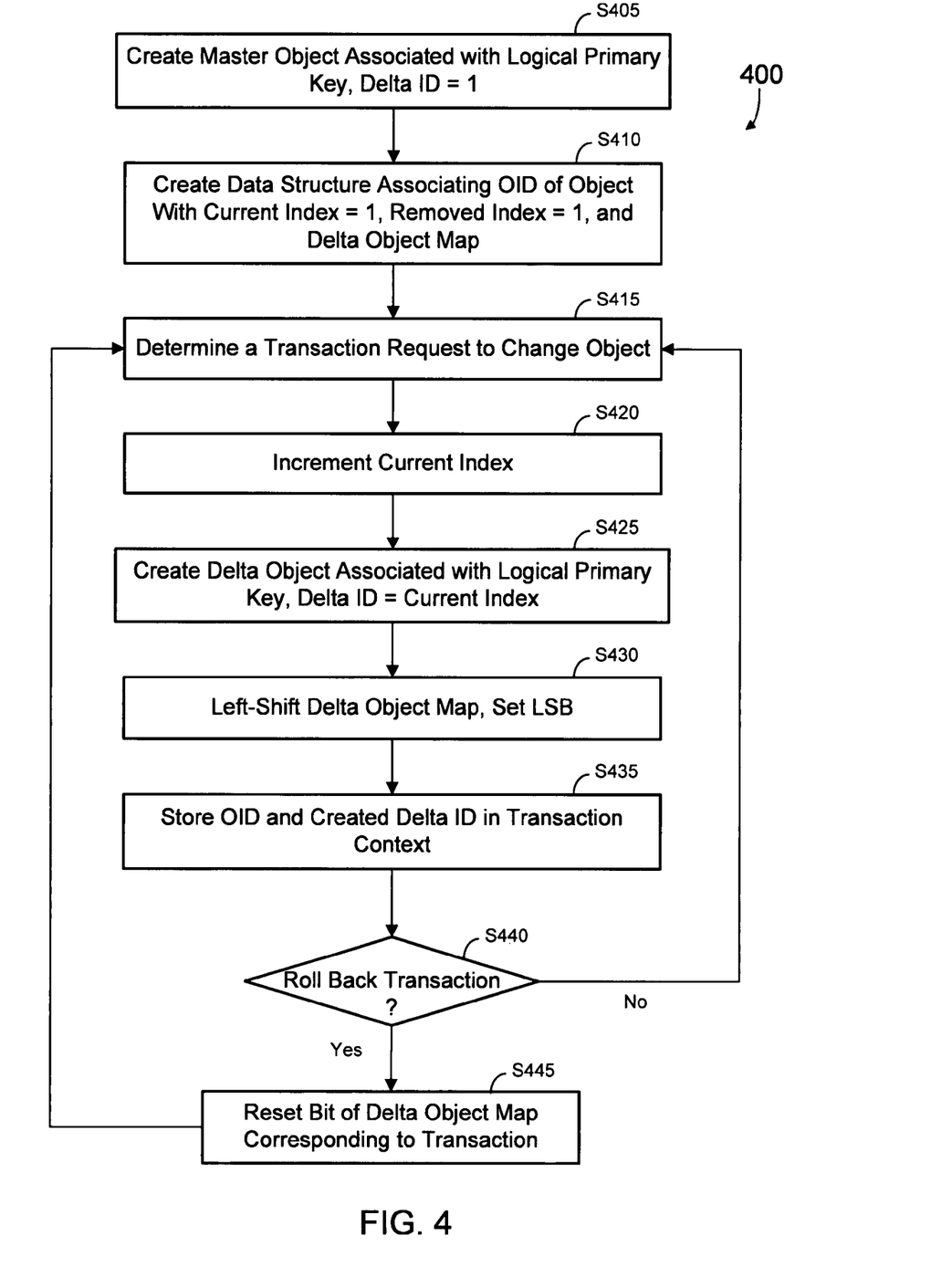
FIG. 4 is a flow diagram of program code according to some embodiments.

FIG. 4 is a flow diagram of process 400 according to some embodiments. Some embodiments of process 400 may provide primitives that may be used to synchronize OID-specific operations requested by different transactions. Server 110 may execute program code of OMS 220 to perform process 400 according to some embodiments.

Process 400 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A master object is initially created at S405. As described with respect to FIG. 3, the master object is associated with the primary key of a database object of interest and a delta ID equal to 1. As also described, creation of the master object results in creation of a pointer (i.e., an OID) referencing the master object.

Figure 5A:
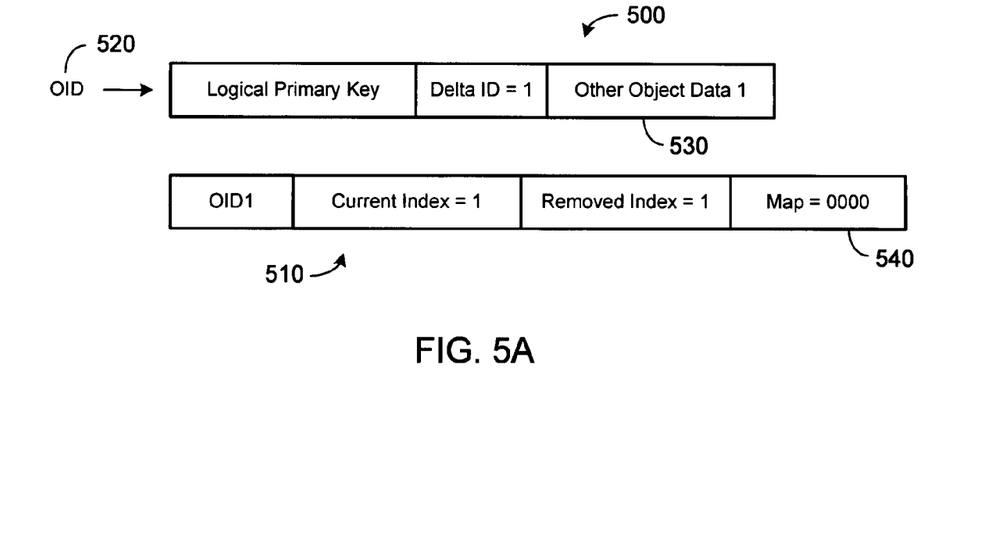
FIGS. 5A through 5D illustrate manipulation and usage of a data structure including a current index, a removed index and a delta object map according to some embodiments.

Next, at S410, a data structure is created associating the OID of the object with a current index equal to 1, a removed index equal to 1 and a delta object map. FIG. 5A illustrates master object 500 and associated data structure 510 according to some embodiments of process 400. Master object 500 is referenced by OID 520 and includes other object data 530 in addition to the aforementioned primary key and data ID.

Data structure 510 is accessible to all transactions according to some embodiments. For example, data structure 510 may be located within a shared memory of server 110 if each transaction runs in a different process on server 110. Alternatively, if the transactions run as multiple threads within one process, the data structure may exist in an address space of the process.

Delta object map 540 provides an indication of each existing delta object that is associated with master object 500. In the current example, the lack of set bits in map 540 indicates that no such delta objects exist.

A transaction request to change an object associated with the subject OID is then determined at S415. The transaction request may be received by the process executing process 400 or may otherwise be detected thereby. In case the object is locked by a parallel transaction, the current index is incremented at S420 and a delta object is created at S425. The delta object is associated with the primary key of the object and a delta ID equal to the incremented current index.

Figure 5B:
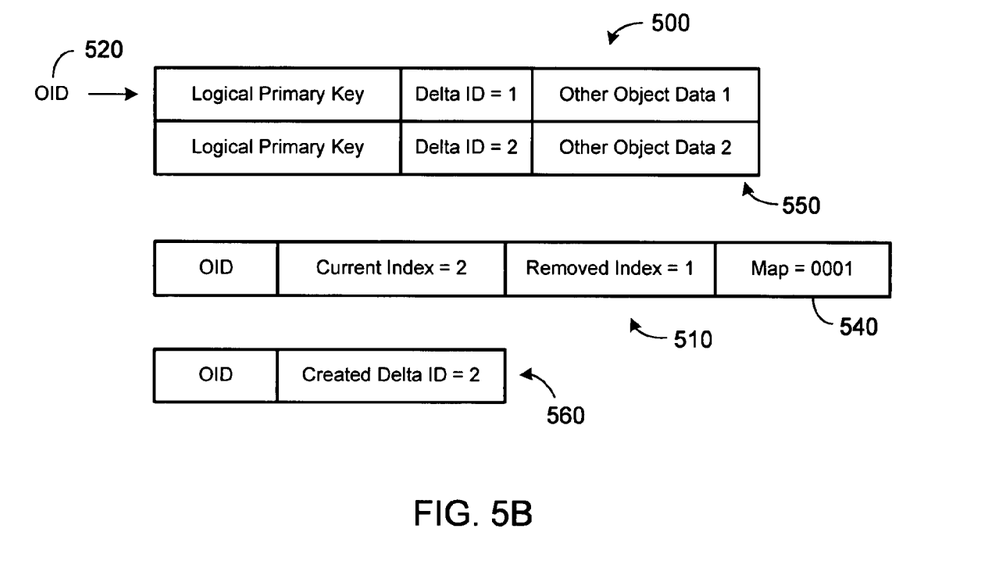

The delta object map is left-shifted and its least-significant bit is set at S430. Moreover, the OID and the ID of the newly-created delta object are stored in a context of the requesting transaction at S435. FIG. 5B shows delta object 550 created at S425 and associated with a change to object 500, data structure 510 as updated at S430, and data 560 stored in the transaction context at S435. The least-significant bit of delta object map 540 indicates the existence of delta object 550.

Figure 5C:
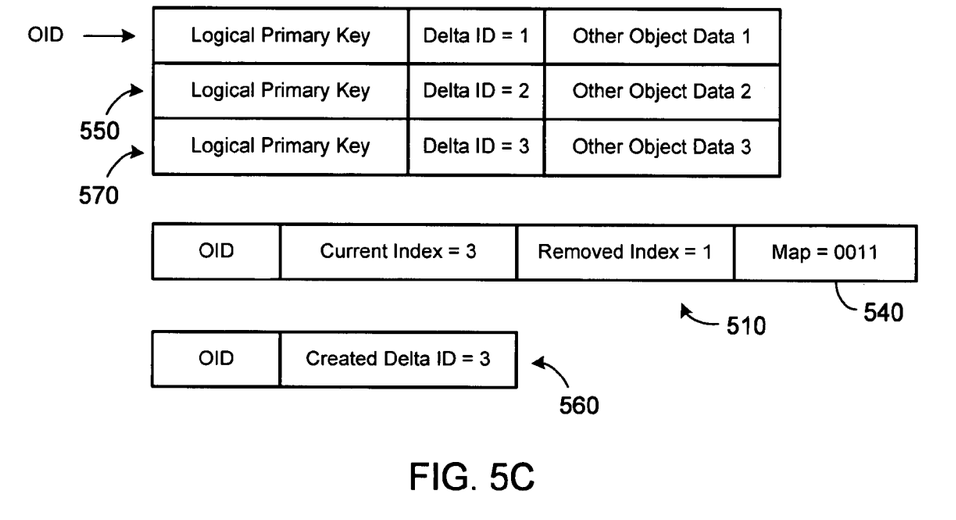

It is determined at S440 whether to rollback the pending transaction. If the determination is negative, the transaction is committed, data structure 560 is deleted, and flow returns to S415. Flow then proceeds from S415 through S440 as described above to create a new delta object and to modify the data structure accordingly. For example, FIG. 5C illustrates new delta object 570 including a delta ID equal to the incremented index and shows object map 540 now indicating delta objects 550 and 570. Also shown in FIG. 5C is data 560 including the OID and an ID of the newly-created delta object, and stored in a context of the current transaction.

Flow continues from S440 to S445 in case it is determined to roll back a pending transaction. For example, flow may proceed to S445 if it is determined to roll back the transaction associated with delta object 570. In this case, data structure 560 is used to determine the bit of the delta object map corresponding to the delta object created in the current transaction, and the bit is reset at S445.

Figure 5D:
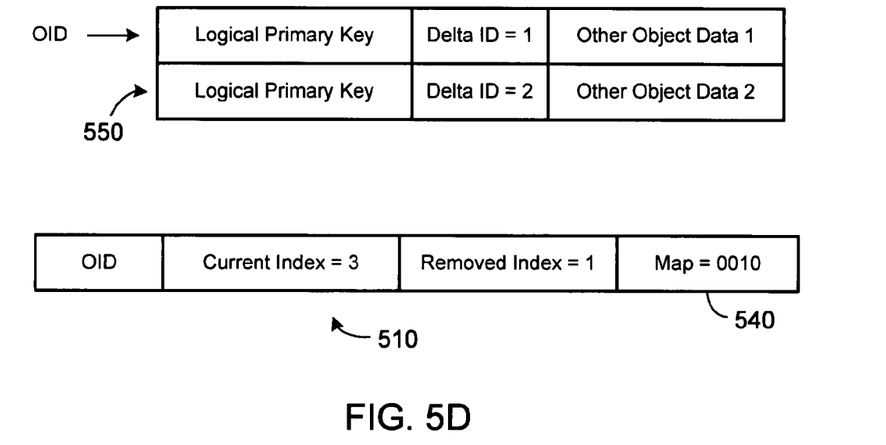

Data structure 560 is deleted as the transaction context is destroyed after the roll back and flow thereafter returns to S415. FIG. 5D illustrates an example of the foregoing, in which a least-significant bit of object map 540 is reset so as to no longer indicate the existence of delta object 570.

Some embodiments may be used in conjunction with a database that provides a "consistent view" for accessing the data in the database. In this context, the term "consistent view" indicates that a transaction views the committed state of the data as it exists at a starting time of the transaction. Even committed data changes (creation, deletion, modification) performed by parallel transactions are invisible as long as no commit or rollback (or explicit "refresh" of consistent view) has occurred in the current session. Only those changes to the data done by the transaction itself are visible within the transaction. Such an arrangement may ensure that data is stable and consistent for planning algorithms used in the current session. Otherwise, either concurrent changes would disturb the planning algorithm while running or it would be necessary to lock all relevant data at the beginning of the current session, leading to massive serialization. Consistent view in the manner described above may also be realized on an application level, for example, by using client-server techniques such as reading all necessary data at the start of a planning transaction into a local buffer and working in this "sandbox" until the live data are updated from the buffer at the end of transaction.

Each change of a data object requires the acquisition of an exclusive logical lock on the object which prevents concurrent transactions from changing the object in parallel. The set of locks held by a transaction can be released automatically at the end of transaction (commit or rollback). A lock cannot be acquired by a transaction if another parallel transaction already holds the lock (lock collision situation).

Figure 6A:
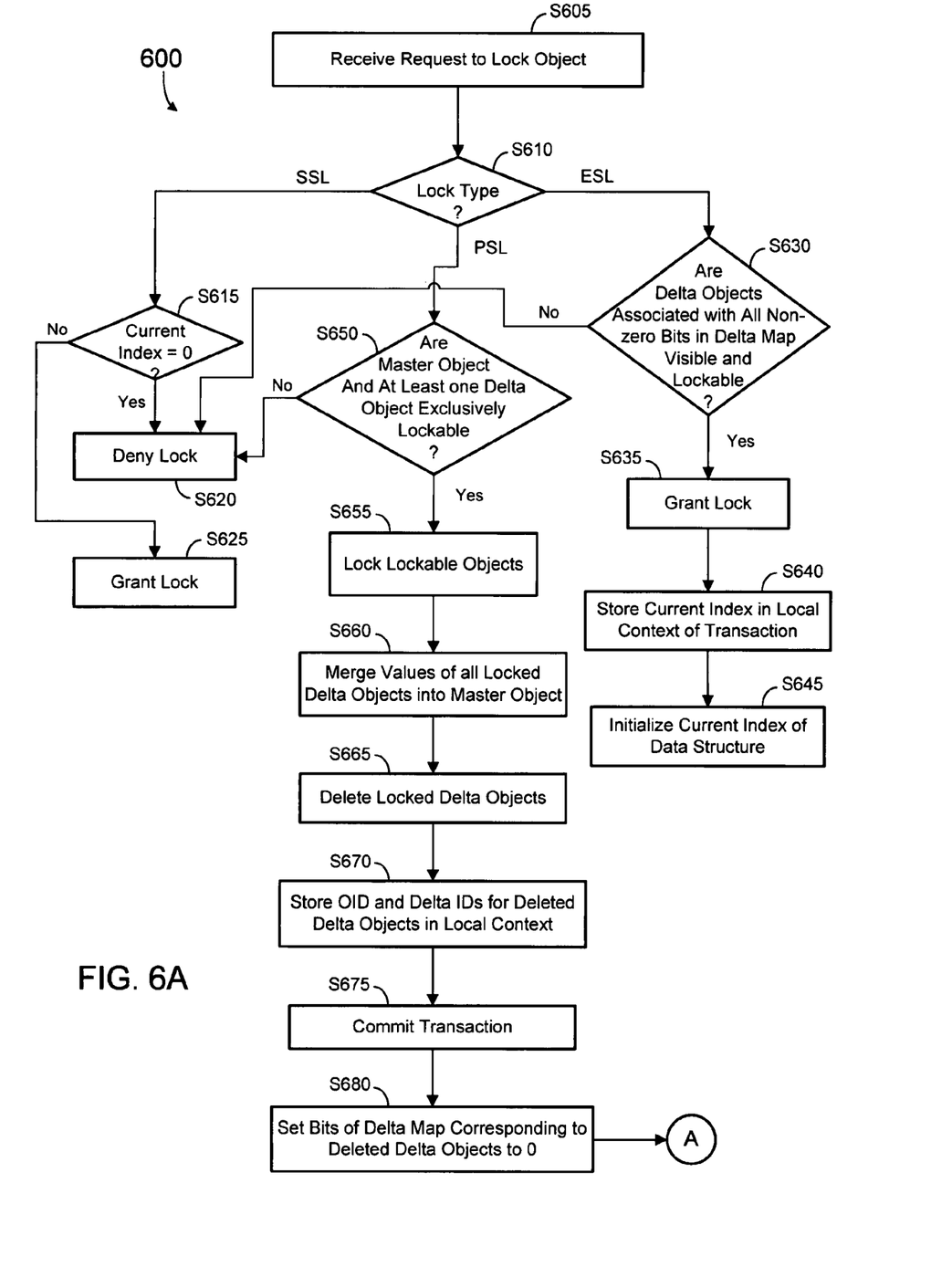
FIGS. 6A and 6B comprise a flow diagram of program code according to some embodiments.
Figure 6B:
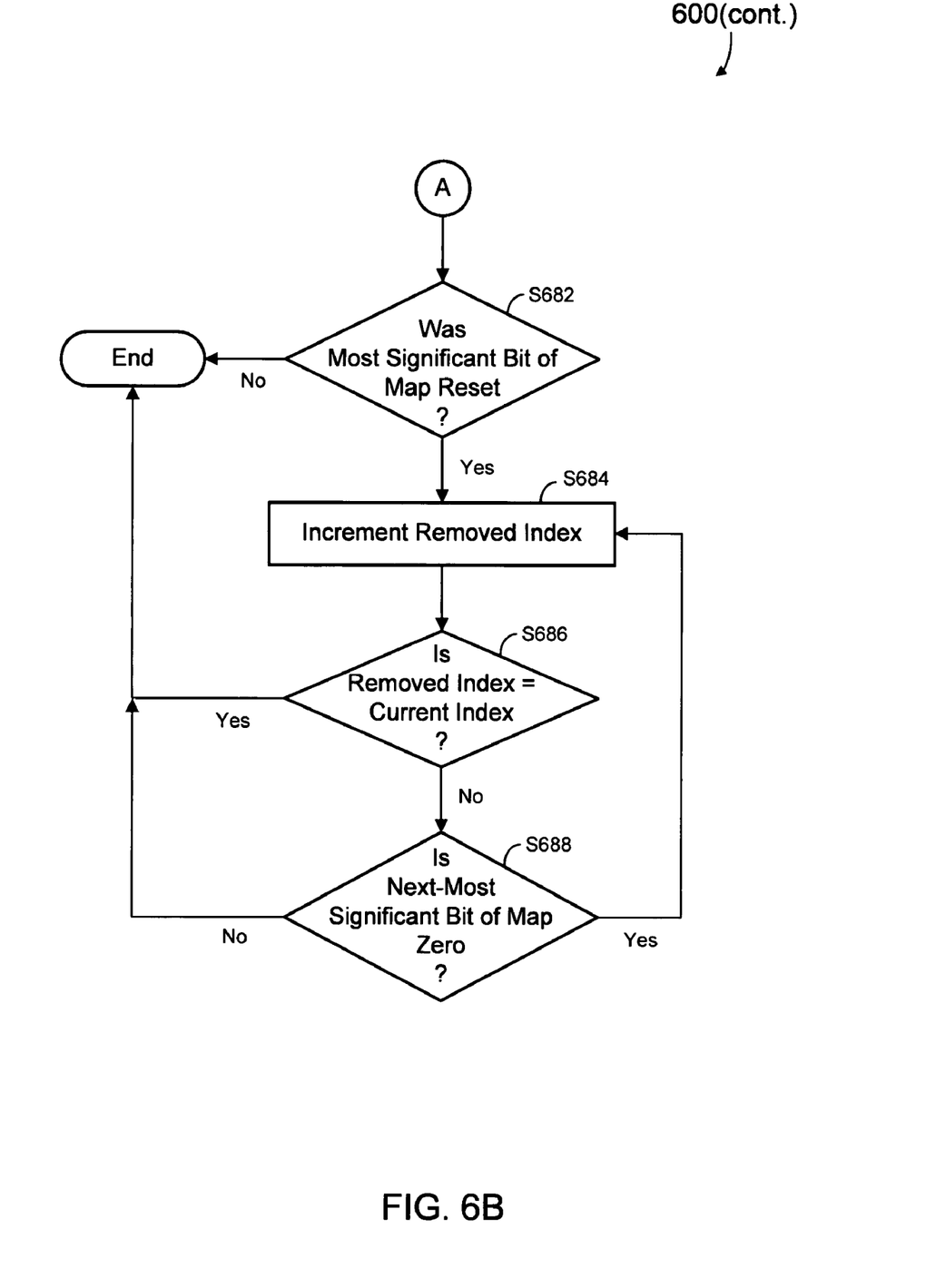

FIGS. 6A and 6B comprise a flow diagram of process 600 for using the above-described primitives to synchronize operations according to some embodiments. Process 600 involves three different types of locks: a shared sub-lock (SSL), an exclusive sub-lock (ESL), and a partial sub-lock (PSL). A transaction may be required to acquire an SSL in order to change an object, and an ESL in order to delete an object.

A PSL may be used to reduce a number of persistent objects in object containers 252. A PSL may be acquired each time an object is accessed. According to some embodiments, a transaction attempts to obtain a PSL and merge delta objects prior to attempting to obtain a lock associated with a desired read, write or delete operation.

A request to lock an object is received at S605. The request may be received on behalf of a particular transaction by one of application libraries 210 and will be assumed to include an OID associated with a primary key of an object of interest. The type of the requested lock is determined at S610. If the requested lock is a SSL, it is determined at S615 whether the current index associated with the object is equal to zero.

The requested lock may be a SSL if the requesting transaction seeks to change the object of interest. The current index (e.g., as described with respect to FIG. 4) associated with the object is equal to zero only if no master object corresponding to the received OID exists. Accordingly, the lock may be denied at S620 if the current index is equal to zero. However, in some embodiments, a new master object associated with the primary key and a new OID are created after the SSL is denied at S620. Accordingly, the desired change operation may then be committed with respect to the new master object.

The SSL is granted at S625 if the determination at S615 is negative. The requesting transaction may then proceed to generate a delta object reflecting a change to a master object associated with the received OID.

Flow proceeds to S630 from S610 if an ESL is requested. At S630, it is determined whether delta objects associated with all non-zero bits in an associated delta object map are visible in the consistent view of the current transaction and lockable. S630 may therefore comprise locating a data structure associated with the received OID such as structure 510 of FIGS. 5A through 5D. As described with respect thereto, each set bit of map 540 identifies a delta object associated with an OID. Some embodiments of S630 therefore comprise determining whether each thusly-identified delta object is visible and lockable.

If not, the ESL is denied at S620. If so, the ESL is granted at S635 and the current index of data structure 510 is stored in the local context of the requesting transaction at S640. The current index may be stored as a created delta ID as shown in FIGS. 5B and 5C. Since granting of the ESL lock typically precedes deletion of the master object associated with the OID, the current index of data structure 540 may be initialized at S645 (e.g., set to zero) to indicate that no delta objects are associated with the OID. Accordingly, the locally-stored data 560 may be used to update the data structure 810 in a case that the deleting transaction is rolled back.

Returning to S610, it may be determined that the requested lock is a PSL. If so, it is determined at S650 whether the master object associated with the subject OID and at least one corresponding delta object are exclusively lockable. The PSL is denied at S620 if the at least two objects are not exclusively lockable.

If the determination at S650 is affirmative, the master object and all the exclusively-lockable delta objects associated therewith are locked at S655. Next, at S660, values of each locked delta object are merged into the locked master object. As a result, the locked delta objects may be deleted at S665.

The OID received at S605 and the delta IDs for each deleted delta object are stored in a local context of the requesting transaction at S670, and the transaction is committed at S675. Finally, at S680, bits of the delta object map that correspond to the deleted delta objects are set to zero. The OID stored at S670 is used to access an associated data structure such as data structure 510, and the stored delta IDs are used to determine which bits of the delta object map should be set to zero.

Execution of process 400 as described above may result in the creation of any number of delta objects associated with a particular OID. A bit-length of delta object map 540 increases as these delta objects are created. S682 through S688 of process 600 are therefore intended to reduce a bit-length of a delta object map based on deleted delta objects.

Figure 7A:
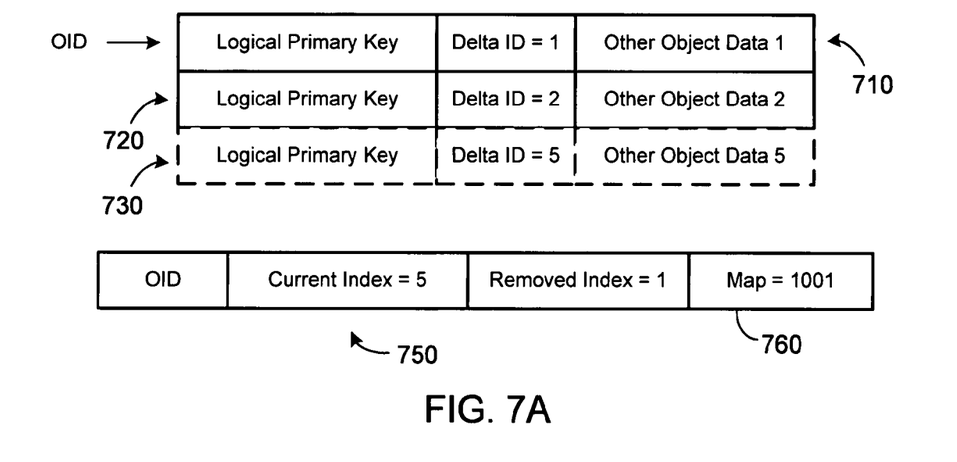
FIGS. 7A through 7D illustrate manipulation and usage of a data structure including a current index, a removed index and a delta object map according to some embodiments.
Figure 7B:
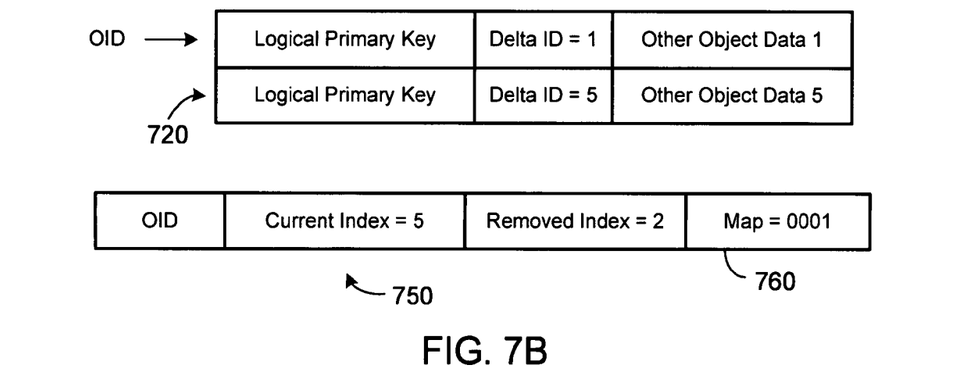

Specifically, flow proceeds to S682 from S680. It is determined at S682 whether a most significant bit of the delta object map was reset at S680. FIGS. 7A and 7B illustrate master object 710, associated delta objects 720 and 730, and data structure 750 for purposes of describing S682. In this regard, it is assumed that delta object 730 was deleted at S665. Accordingly, and as shown in FIG. 7B, a bit of delta object map 760 corresponding to object 730 was set to zero at S680. The determination at S682 is therefore affirmative and flow continues to S684.

Figure 7C:
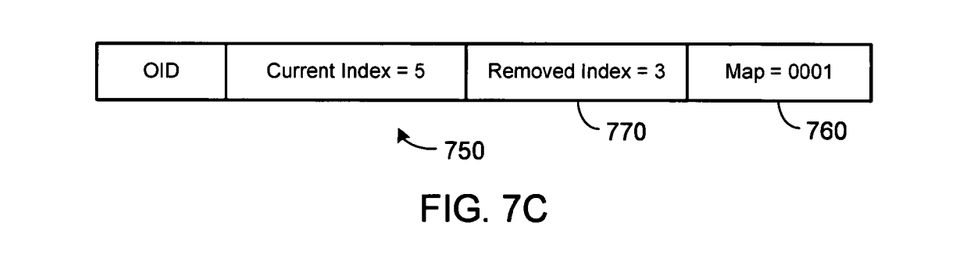

The removed index is incremented at S684. FIG. 7C continues the present example by updating data structure 750 to increment removed index 770. At, S686, it is determined whether the removed index is equal to the current index. If not, as in the example of FIG. 7C, flow proceeds to S688. It is determined at S688 whether a next-most significant bit of the delta object map is equal to zero. Flow returns to S684 and continues as described above if the next-most significant bit of the delta object map is equal to zero.

Figure 7D:
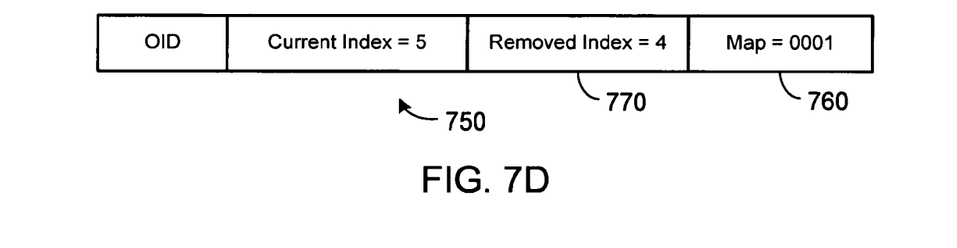

Continuing with the present example, the next-most significant bit of the map 760 is zero, so removed index 770 is incremented at S684 as shown in FIG. 7D. Flow again proceeds from S686 to S688 because removed index 770 is not equal to the current index of data structure 750. Process 600 thereafter ends because it is determined at S688 that the next-most significant bit of delta object map 760 is not equal to zero.

As a result of the foregoing, the operational length of the delta object map is equal to (current index−removed index) and the non-zero bits of the delta object map represent valid delta objects.

Processes 400 and 600 concern operations associated with a single OID. According to some embodiments, the single OID may be one of several OIDs associated with a single logical primary key. In some of such embodiments, each master object and delta object associated with a single OID is associated with a single group ID.

Figure 8:
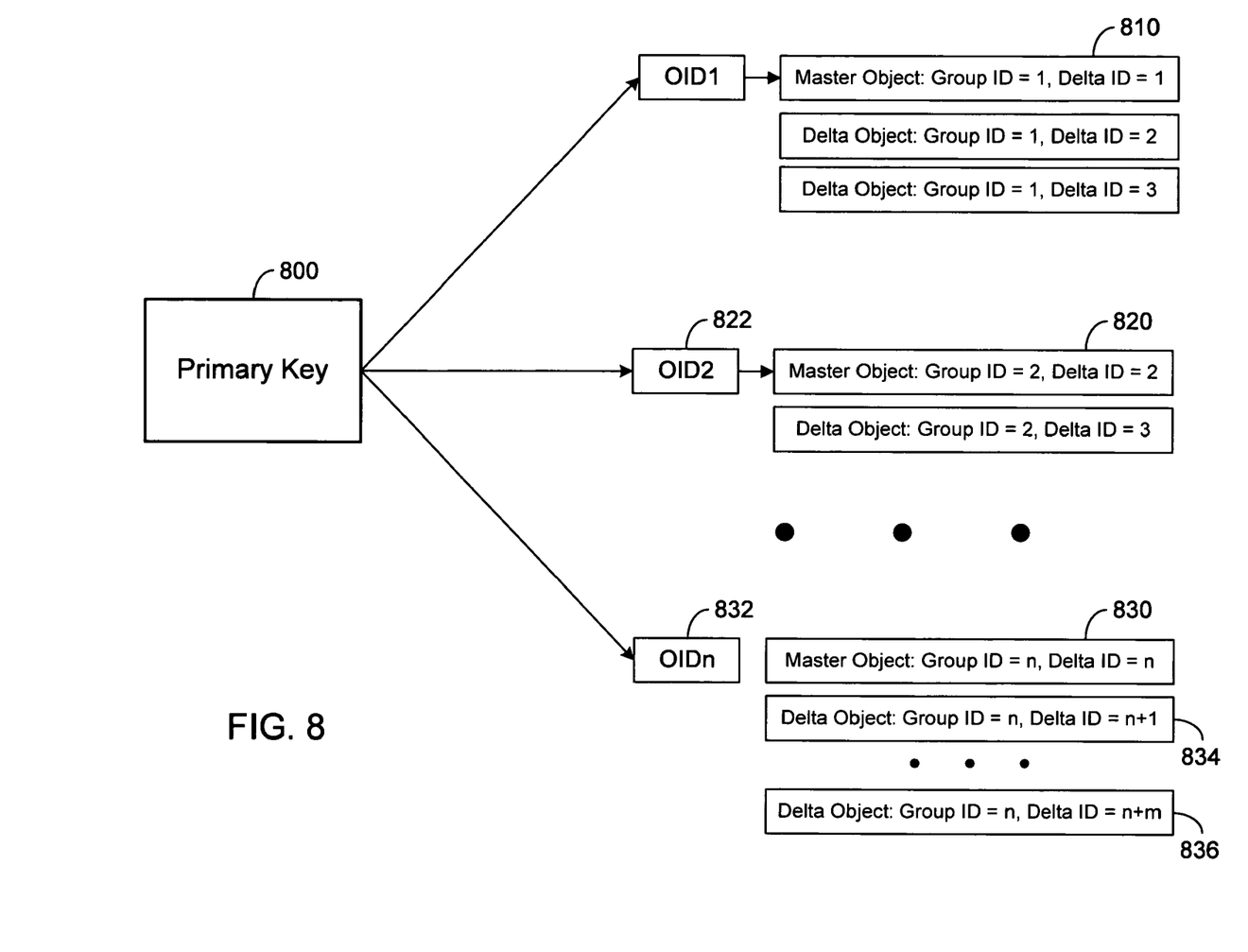
FIG. 8 illustrates relationships between a primary key, OIDs, master objects and delta objects according to some embodiments.

FIG. 8 illustrates relationships between primary key 800, master objects 810 through 830, and associated delta objects according to some embodiments. Master object 830 represents any master object that may be created according to process 400, OID 832 represents a pointer referencing object 830, and delta objects 834 and 836 represent a 1st and an mth delta object of master object 830.

According to the FIG. 8 arrangement, a single OID may not be sufficient to reference all objects associated with a single primary key. For instance, a read operation using only OID 822 would yield an incomplete reading of the object associated with primary key 800. A read operation using primary key 800 may, however, correctly read the object by reading all related master and delta objects. In contrast to the read operation, an updating (e.g., change, delete) operation can use any of the FIG. 8 OIDs as the operation will be handled correctly regardless of for which master object a new delta is created.

The embodiments described herein are solely for the purpose of illustration. Those in the art will recognize that other embodiments may be practiced with modifications and alterations which are also encompassed by one or more of the following claims.

What is claimed is:

1. A method comprising:
using a processor to perform the following:
creating a first database object associated with a primary key and a first delta ID m, the first database object is an instance of an object-oriented class;
associating a first pointer with the first database object;
creating a data structure associating the first pointer with a first index m, a second index m and a delta object map, the delta object map providing an indication of each existing delta object associated with the first database object;
determining a request from a transaction to change a database object associated with the first pointer;
incrementing the first index of the data structure;
creating a second database object associated with the primary key and a second delta ID m+1, the second database object being associated with a change to the first database object, the second database object is an instance of an object-oriented class; and
modifying the delta object map to indicate the second database object.

2. The method according to claim 1, further comprising:
storing the first pointer in association with an indicator of the second database object in a context of the transaction;
determining that the transaction is to be rolled back; and
modifying the delta object map based on the indicator to not indicate the second database object.

3. The method according to claim 1, further comprising:
receiving a request from a second transaction for an exclusive sub-lock of the first database object;
determining whether all objects indicated by the delta object map are visible and lockable;
granting the exclusive sub-lock of the first database object;
storing the first index of the data structure in a context of the second transaction; and
initializing the first index of the data structure.

4. The method according to claim 1, further comprising:
receiving a request for a shared sub-lock of the first database object;
determining that the first index of the data structure is not equal to an initial index value; and
granting the shared sub-lock of the first database object.

5. The method according to claim 1, further comprising:
receiving a request for a partial sub-lock of the first database object from a second transaction;
determining that the first database object and one or more other database objects associated with the first pointer are visible are exclusively lockable;
merging the one or more other database objects into the first database object;
storing the first pointer and a delta ID of each of the one or more other database objects in a local context of the second transaction; and
modifying the delta object map so as to not indicate the one or more other database objects.

6. The method according to claim 5, further comprising:
deleting the one or more other database objects;
determining whether modifying the delta object map comprised resetting a most significant bit of the delta object map;

incrementing the second index of the data structure if modifying the delta object map comprised resetting the most significant bit of the delta object map;

determining whether the second index of the data structure is equal to the first index of the data structure;

if the second index of the data structure is not equal to the first index of the data structure, determining whether a next-most significant bit of the delta object map is zero; and incrementing the second index of the data structure if the next-most significant bit of the delta object map is zero.

7. The method according to claim 1, further comprising:

creating a third database object associated with the primary key and a third delta ID n;

associating a second pointer with the third database object;

creating a second data structure associating the second pointer with a third index n, a fourth index n and a second delta object map;

determining a second request from a second transaction to change a database object associated with the second pointer;

incrementing the third index of the second data structure;

creating a fourth database object associated with the primary key and a fourth delta ID n+1, the fourth database object being associated with a change to the third database object; and modifying the second delta object map to indicate the fourth database object.

8. The method according to claim 7, further comprising:

receiving a request from a second transaction for an exclusive sub-lock of the second database object;

determining whether all objects indicated by the second delta object map are visible and lockable;

granting the exclusive sub-lock of the second database object;

storing the third index of the second data structure in a context of the second transaction; and initializing the third index of the data structure.

9. The method according to claim 7, further comprising:

receiving a request for a partial sub-lock of the second database object from a second transaction;

determining that the second database object and one or more other database objects associated with the second pointer are visible are exclusively lockable;

merging the one or more other database objects into the second database object;

storing the second pointer and a delta ID of each of the one or more other database objects in a local context of the second transaction;

modifying the second delta object map so as to not indicate the one or more other database objects;

deleting the one or more other database objects;

determining whether modifying the second delta object map comprised resetting a most significant bit of the second delta object map;

incrementing the fourth index of the second data structure if modifying the second delta object map comprised resetting the most significant bit of the second delta object map;

determining whether the fourth index of the second data structure is equal to the third index of the second data structure;

if the fourth index of the second data structure is not equal to the third index of the second data structure, determining whether a next-most significant bit of the second delta object map is zero; and incrementing the fourth index of the second data structure if the next-most significant bit of the second delta object map is zero.

10. A non-transitory computer-readable medium storing program code, the medium comprising:

code to create a first database object associated with a primary key and a first delta ID m, the first database object is an instance of an object-oriented class;

code to associate a first pointer with the first database object;

code to create a data structure associating the first pointer with a first index m, a second index m and a delta object map, the delta object map providing an indication of each existing delta object associated with the first database object;

code to determine a request from a transaction to change a database object associated with the first pointer;

code to increment the first index of the data structure;

code to create a second database object associated with the primary key and a second delta ID m+1, the second database object being associated with a change to the first database object, the second database object is an instance of an object-oriented class; and code to modify the delta object map to indicate the second database object.

11. The medium according to claim 10, further comprising:

code to store the first pointer in association with an indicator of the second database object in a context of the transaction;

code to determine that the transaction is to be rolled back; and code to modify the delta object map based on the indicator to not indicate the second database object.

12. The medium according to claim 10, further comprising:

code to receive a request from a second transaction for an exclusive sub-lock of the first database object;

code to determine whether all objects indicated by the delta object map are visible and lockable;

code to grant the exclusive sub-lock of the first database object;

code to store the first index of the data structure in a context of the second transaction; and code to initialize the first index of the data structure.

13. The medium according to claim 10, further comprising:

code to receive a request for a shared sub-lock of the first database object;

code to determine that the first index of the data structure is not equal to an initial index value; and code to grant the shared sub-lock of the first database object.

14. The medium according to claim 10, further comprising:

code to receive a request for a partial sub-lock of the first database object from a second transaction;

code to determine that the first database object and one or more other database objects associated with the first pointer are visible are exclusively lockable;

code to merge the one or more other database objects into the first database object;

code to store the first pointer and a delta ID of each of the one or more other database objects in a local context of the second transaction; and code to modify the delta object map so as to not indicate the one or more other database objects.

15. The medium according to claim 14, further comprising:

code to delete the one or more other database objects;

code to determine whether modifying the delta object map comprised resetting a most significant bit of the delta object map;
code to increment the second index of the data structure if modifying the delta object map comprised resetting the most significant bit of the delta object map;
code to determine whether the second index of the data structure is equal to the first index of the data structure;
code to determine, if the second index of the data structure is not equal to the first index of the data structure, whether a next-most significant bit of the delta object map is zero; and
code to increment the second index of the data structure if the next-most significant bit of the delta object map is zero.

16. The medium according to claim 10, further comprising:
code to create a third database object associated with the primary key and a third delta ID n;
code to associate a second pointer with the third database object;
code to create a second data structure associating the second pointer with a third index n, a fourth index n and a second delta object map;
code to determine a second request from a second transaction to change a database object associated with the second pointer;
code to increment the third index of the second data structure;
code to create a fourth database object associated with the primary key and a fourth delta ID n+1, the fourth database object being associated with a change to the third database object; and
code to modify the second delta object map to indicate the fourth database object.

17. The medium according to claim 16, further comprising:
code to receive a request from a second transaction for an exclusive sub-lock of the second database object;
code to determine whether all objects indicated by the second delta object map are visible and lockable;
code to grant the exclusive sub-lock of the second database object;
code to store the third index of the second data structure in a context of the second transaction; and
code to initialize the third index of the data structure.

18. The medium according to claim 16, further comprising:
code to receive a request for a partial sub-lock of the second database object from a second transaction;
code to determine that the second database object and one or more other database objects associated with the second pointer are visible are exclusively lockable;
code to merge the one or more other database objects into the second database object;
code to store the second pointer and a delta ID of each of the one or more other database objects in a local context of the second transaction;
code to modify the second delta object map so as to not indicate the one or more other database objects;
code to delete the one or more other database objects;
code to determine whether modifying the second delta object map comprised resetting a most significant bit of the second delta object map;
code to increment the fourth index of the second data structure if modifying the second delta object map comprised resetting the most significant bit of the second delta object map;
code to determine whether the fourth index of the second data structure is equal to the third index of the second data structure;
code to determine, if the fourth index of the second data structure is not equal to the third index of the second data structure, whether a next-most significant bit of the second delta object map is zero; and
code to increment the fourth index of the second data structure if the next-most significant bit of the second delta object map is zero.

19. A system comprising:
an object-oriented database;
an object management system including a processor to:
create a first database object associated with a primary key and a first delta ID m, the first database object is an instance of an object-oriented class;
associate a first pointer with the first database object;
create a data structure associating the first pointer with a first index m, a second index m and a delta object map, the delta object map providing an indication of each existing delta object associated with the first database object;
determine a request from a transaction to change a database object associated with the first pointer;
increment the first index of the data structure;
create a second database object associated with the primary key and a second delta ID m+1, the second database object being associated with a change to the first database object, the second database object is an instance of an object-oriented class; and
modify the delta object map to indicate the second database object.

20. The system according to claim 19, the object management system further to:
receive a request from a second transaction for an exclusive sub-lock of the first database object;
determine whether all objects indicated by the delta object map are visible and lockable;
grant the exclusive sub-lock of the first database object;
store the first index of the data structure in a context of the second transaction; and
initialize the first index of the data structure.

21. The system according to claim 19, the object management system further to:
receive a request for a partial sub-lock of the first database object from a second transaction;
determine that the first database object and one or more other database objects associated with the first pointer are visible are exclusively lockable;
merge the one or more other database objects into the first database object;
store the first pointer and a delta ID of each of the one or more other database objects in a local context of the second transaction; and
modify the delta object map so as to not indicate the one or more other database objects.

22. The system according to claim 21, the object management system further to:
delete the one or more other database objects;
determine whether modifying the delta object map comprised resetting a most significant bit of the delta object map;
increment the second index of the data structure if modifying the delta object map comprised resetting the most significant bit of the delta object map;
determine whether the second index of the data structure is equal to the first index of the data structure;

determine, if the second index of the data structure is not equal to the first index of the data structure, whether a next-most significant bit of the delta object map is zero; and increment the second index of the data structure if the next-most significant bit of the delta object map is zero.

23. The system according to claim 19, the object management system further to:

create a third database object associated with the primary key and a third delta ID n;

associate a second pointer with the third database object;

create a second data structure associating the second pointer with a third index n, a fourth index n and a second delta object map;

determine a second request from a second transaction to change a database object associated with the second pointer;

increment the third index of the second data structure;

create a fourth database object associated with the primary key and a fourth delta ID n+1, the fourth database object being associated with a change to the third database object; and modify the second delta object map to indicate the fourth database object.

24. The system according to claim 23, the object management system further to:

receive a request from a second transaction for an exclusive sub-lock of the second database object;

determine whether all objects indicated by the second delta object map are visible and lockable;

grant the exclusive sub-lock of the second database object;

store the third index of the second data structure in a context of the second transaction; and initialize the third index of the data structure.

25. The system according to claim 23, the object management system further to:

receive a request for a partial sub-lock of the second database object from a second transaction;

determine that the second database object and one or more other database objects associated with the second pointer are visible are exclusively lockable;

merge the one or more other database objects into the second database object;

store the second pointer and a delta ID of each of the one or more other database objects in a local context of the second transaction;

modify the second delta object map so as to not indicate the one or more other database objects;

delete the one or more other database objects;

determine whether modifying the second delta object map comprised resetting a most significant bit of the second delta object map;

increment the fourth index of the second data structure if modifying the second delta object map comprised resetting the most significant bit of the second delta object map;

determine whether the fourth index of the second data structure is equal to the third index of the second data structure;

determine, if the fourth index of the second data structure is not equal to the third index of the second data structure, whether a next-most significant bit of the second delta object map is zero; and increment the fourth index of the second data structure if the next-most significant bit of the second delta object map is zero.

* * * * *